United States Patent [19]

Yoshio

[11] 4,113,115
[45] Sep. 12, 1978

[54] MANIPULATOR

[75] Inventor: Hashimoto Yoshio, Hamamatsu, Japan

[73] Assignee: Kabushiki Kaisha Yachiyo Kogyo Kenkyusho, Hamamatsu, Japan

[21] Appl. No.: 805,840

[22] Filed: Jun. 13, 1977

[30] Foreign Application Priority Data

Jun. 18, 1976 [JP] Japan .................. 51-72056

[51] Int. Cl.² ............................................. B65G 47/90
[52] U.S. Cl. ........................... 214/1 BB; 214/1 BC; 214/1 BD; 214/1 CM; 214/1 Q
[58] Field of Search ................. 214/1 B, 1 BS, 1 QA, 214/1 BB, 1 BT, 1 BC, 1 BH, 151, 1 CM, 1 BD, 1 BV, 147 T, 1 Q

[56] References Cited

U.S. PATENT DOCUMENTS

| 1,811,832 | 6/1931 | Mayers | 214/1 BC |
|---|---|---|---|
| 2,224,975 | 12/1940 | McNamara | 214/1 BC |
| 2,974,811 | 3/1961 | Dammert et al. | 214/1 BC |
| 3,007,097 | 10/1961 | Shelley et al. | 214/1 BC X |
| 3,212,649 | 10/1965 | Johnson et al. | 214/1 BC |
| 3,543,947 | 12/1970 | Devol | 214/1 BC |
| 3,572,519 | 3/1971 | Tezuka | 214/1 BC |
| 3,935,950 | 2/1976 | Burch | 214/1 BB |

Primary Examiner—Frank E. Werner

Attorney, Agent, or Firm—Polster, Polster and Lucchesi

[57] ABSTRACT

A manipulator for industrial purposes constructed with a housing for accommodating therein major component parts such as driving mechanism therefor; a main shaft held in a rotatable manner; an auxiliary shaft concentrically fitted in the main shaft; an arm member fixedly supported on the top of the auxiliary shaft; a hand member for clamp-holding the work-piece therein; a control shaft which is concentrically fitted within the auxiliary shaft; a reversible electric motor fixedly provided on one external surface part of the housing; a worm gear member; a worm provided on the motor; a group of gears or a gear train for moving the auxiliary shaft; another group of gears for rotating the control shaft; a supporting frame integrally formed with the main shaft; an intermittent gear; a device to cause the main shaft to follow the movement of the worm gear after the main shaft is rotated for a certain definite rotational angle; and a device to detect rotation of the main shaft after it is rotated for a certain definite angle, and to cause the reversible electric motor to rotate forwardly or inversely, the worm on the motor shaft, worm gear, two groups of gears, supporting frame, intermittent gear, and means for causing the main shaft to follow the movement of the worm gear being accommodated within the housing.

7 Claims, 10 Drawing Figures

MANIPULATOR

BACKGROUND OF THE INVENTION a. Field of the Invention

This invention relates to a manipulator, or a robotized mechanism for various industrial purposes. More particularly, it is concerned with a manipulator of a type which clamp-holds a work-piece in a mechanical hand capable of moving up and down, and moves the work-piece from one place to other designated places by the rotatory movement of the mechanical hand.

b. Description of Prior Art

For this kind of the manipulator, or the industrial robot, there have so far been known those which utilize an arm link, and the like as the work-piece carrying device. This type of manipulator, however, is highly disadvantageous in that not only is its construction intricate, but also a considerably wide operating space is required owing to the arm link and various other component members being exposed outside its casing, hence it has faced with a great restriction when it is to be installed in contiguity to other related machines and appliances.

SUMMARY OF THE INVENTION

The present invention has been made with a view to removing the defects inherent in the conventional manipulator as stated in the foregoing, and to providing an improved manipulator or robotized mechanism useful for various industrial purposes.

It is therefore the primary object of the present invention to provide an improved manipulator which is constructed in as small a size as possible so that the space required for its installation and operations may be kept minimal.

It is the secondary object of the present invention to provide an improved manipulator or an industrial robot capable of being disposed even in a small space adjacent to other related machines and appliances by incorporating, as far as possible, the power transmission mechanism therefor within the casing to thereby minimize the number of component parts to be exposed outside.

According to the present invention, generally speaking, there is provided a manipulator for various industrial purposes which comprises a housing or casing for accommodating therein major component parts such as driving mechanism therefor; a main shaft held on both upper and lower surfaces of the housing in a rotatable manner; an auxiliary shaft concentrically fitted in the main shaft in a manner as to be rotatable together with the main shaft, and projecting outwardly of the upper surface of the housing, the auxiliary shaft being also movable in the up and down direction; an arm member fixedly supported on the top end part of the auxiliary shaft substantially perpendicularly to the axial line thereof, the arm being provided in it with a control mechanism for holding, releasing, and shifting a work-piece from one place to other designated places; a hand member for clamp-holding the work-piece therein, the hand member being mounted on one end part of the arm member, and having at the tip end thereof a pair of finger members; a control shaft which is concentrically fitted within the auxiliary shaft in a rotatable manner, and which operates the control mechanism for opening and closing the finger members provided on the arm member; a reversible electric motor fixedly provided on one external surface part of the housing; a worm gear member which is rotatably mounted on an outer peripheral surface part of the main shaft, and receives driving force of the reversible electric motor through a worm provided on the motor and being meshed therewith; a group of gears or a gear train for moving the auxiliary shaft in the up and down direction; another group of gears for rotating the control shaft; a supporting frame for supporting these two groups of gears, the supporting frame being integrally formed with the main shaft; an intermittent gear which rotates along with the worm gear, and selectively transmits the driving force of the reversible electric motor to the two groups of gears to cause the auxiliary shaft to move up and down, or to cause the control shaft to rotate in either direction; a device to cause the main shaft to follow the movement of the worm gear after the main shaft is rotated for a certain definite rotational angle; and a device to detect rotation of the main shaft after it is rotated for a certain definite angle, and to cause the reversible electric motor to rotate forwardly or inversely, the worm on the motor shaft, worm gear, two groups of gears, supporting frame, intermittent gear, and a device for causing the main shaft to follow the movement of the worm gear being accommodated within the housing.

There have thus been outlined rather broadly the more important features of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important therefore that the claims be regarded as including such equivalent constructions to an extent that they do not depart from the spirit and scope of the invention.

BRIEF DESCRIPTION OF THE DRAWINGS

Specific embodiments of the present invention have been chosen for the purposes of illustration and description, and are shown in the accompanying drawings, forming a part of the specification, in which.

DETAILED DESCRIPTION OF PREFERRED EMBODIMENT

Figure 1:
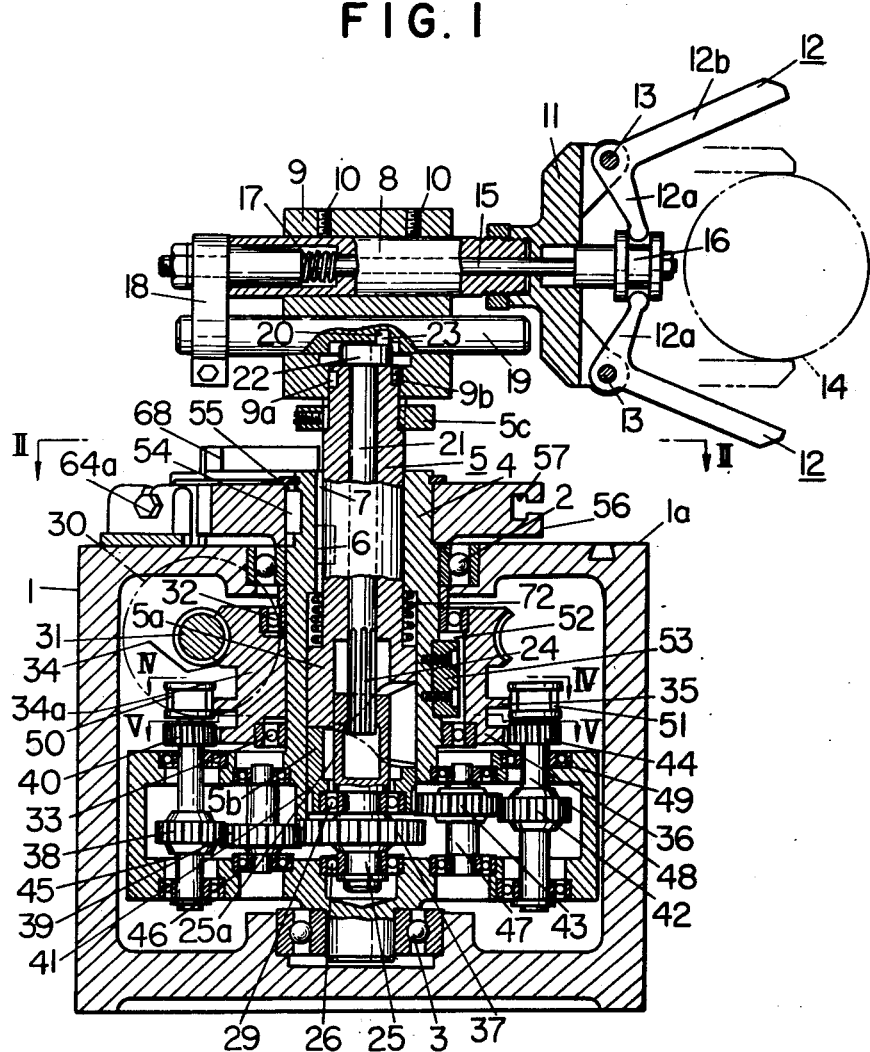
FIG. 1 is a front view in longitudinal cross-section showing the manipulator according to the present invention, when viewed along the line I—I in the subsequent FIG. 2.

In the following, a preferred embodiment of the manipulator, or the robotized mechanism for industrial purposes, according to the present invention will be described in reference to the accompanying figures of the drawing.

1. Construction of the Manipulator

Referring to FIG. 1, a housing 1 has a main shaft 4 which passes through the upper surface thereof and extends up to the lower surface thereof and is rotatably supported at these upper and lower surface parts of the housing by means of bearing 2 and 3. Within the main shaft 4, there is concentrically fitted an auxiliary shaft 5 in freely rotatable and vertically movable manners along the concentric axis of both main shaft and auxiliary shaft. The top end of this auxiliary shaft is outwardly projected from the top surface of the housing. The auxiliary shaft 5 is further constructed in such a fashion that it may be rotated together with the main shaft 4 by fitting a key 6 which is provided at a predetermined position on the outer peripheral surface thereof into a key receiving groove 7 formed in the inner peripheral surface of the main shaft 4. A block 9 to hold an arm 8 is fixed on the top end part of the above-mentioned auxiliary shaft 5 by a key 9a and a stopper screw 9b so as to be rotatable together with the auxiliary shaft 5. Below the block 9, there is mounted a stopper 5c which contacts the end surface of the main shaft 4 at the time of lowering or downward movement of the auxiliary shaft 5. The arm 8 is fitted onto the block 9 in such a manner that it may intersect substantially orthogonally with respect to the auxiliary shaft 5, and is securely fixed at a predetermined position by bolts 10, 10. The bolts 10, 10 may be loosened to cause the arm 8 to move back and forth in the horizontal direction (i.e., left-and-right direction in FIG. 1). A hand member 11 is fixed at one end of the arm 8. The hand member has a pair of mutually opposed finger members 12, 12, each being in the shape of a letter "L". The finger members are mounted at their angled portion on both ends of the hand member and fixed by pins 13, 13 in such a manner that they can be opened and closed pivotally. A short side 12a of each finger member 12 serves to open and close the finger member, while the long side 12b thereof serves to clamp-hold and release the work-piece 14. The tip end part of the short side 12a in each of both finger members 12, 12 is engaged with a circumferential groove 16 formed at one tip end of the shaft 15 for the finger member opening-and-closing operations, which is slidably held in the arm 8. Further, in the sliding passageway formed in the arm member 8 to enable sliding motion of the shaft 15 for the opening and closing operations of the finger members provided on the hand member fixed at the extreme end of the arm member 8 to be effected, there is provided a buffer coil spring 17 to effect the reciprocating motion of the shaft 15. A stopper 18 is fixed at the other end of the above-mentioned shaft 15 for the finger member opening-and-closing operations. To this stopper 18, there is fixed on end of a shaft 19 for transmitting force to be exerted at the time of opening and closing of the finger members, the force transmitting shaft being held on the arm block 9 in a slidable manner as well as in parallel with the above-mentioned arm member 8. The force transmitting shaft 19 for the opening and closing of the finger members has a groove 20 which is downwardly open in the direction perpendicular to the axial line thereof.

Within the above-mentioned auxiliary shaft 15, there is further fitted concentrically a shaft 21 for controlling the opening and closing of the finger members, the control shaft 21 being made rotatable within the auxiliary shaft 5. At the top end of the control shaft 21, there is mounted a circular disc 22, the lower surface of which is in contact with the top end surface of the auxiliary shaft 5 to function as a stopper for preventing the same from slipping out of its place. An eccentric pin 23 fitted on the upper surface of the circular disc 22 is engaged with the groove 20 of the above-mentioned opening and closing force transmitting shaft 19. A spline 24 is formed at the lower part of the control shaft 21, and a shaft portion 25 having a boss 25a which is fitted to this spline 24 is mounted on the lower interior part of the main shaft 4 through a bearing 26.

The above-mentioned auxiliary shaft 5 is divided into the upper and lower portions 5a and 5b. Each of the opposing surfaces of the split shaft portions has, on its circumference, a cam 27 (and 28) having a single peak or protrusion (vide FIG. 3) formed. The lower cam shaft portion 5b is mounted on the outer peripheral surface of the shaft part 25 of the above-mentioned control shaft 21 through a bearing 29.

Figure 4:
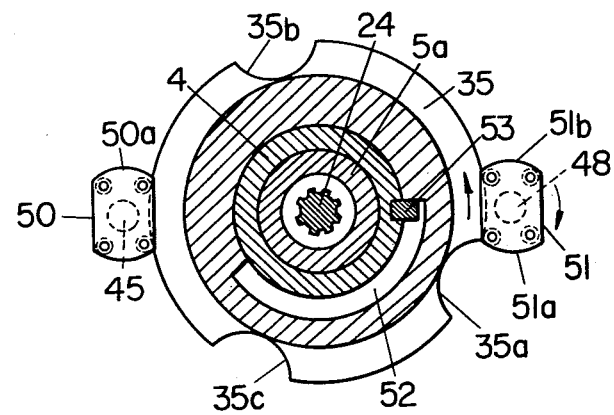
FIG. 4 is a cross-sectional view of the arrangement of the main shaft, auxiliary shaft, cam plate, and other related component parts as viewed along the line IV—IV in FIG. 1.

A reversible electric motor 30 is mounted on the outer surface of the housing 1, and the rotational, or driving, force thereof is transmitted to a worm gear 34 which is mounted on the main shaft 4 through the bearings 32 and 33, and is meshed with the motor 30 through a worm shaft 31. The worm gear 34 has a cam plate 35 (vide FIG. 4) and an intermittent gear 36 (vide FIG. 5) on a boss section 34a formed on the worm gear 34 in a manner projecting downward from it. A gear 40 for transmitting the opening and closing force of the finger members to a gear 37 fixed to the boss shaft part 25 of the above-mentioned control shaft 21 through gears 38 and 39 is disposed at a position where it is to be meshed with the intermittent gear 36. In the same manner, a driving force transmitting gear 44 for raising and lowering the auxiliary shaft 5 is disposed at a position where it is meshed with the intermittent gear 36 and in substantial opposition to the above-mentioned finger opening and closing force transmitting gear 40. This gear 44 transmits the driving force to a gear 41 formed on the outer peripheral surface of the lower cam shaft portion of the above-mentioned auxiliary shaft 5 through gears 42 and 43. Each of supporting shafts 45, 46, 47, and 48 for the above-mentioned groups of gears is held by a frame 49 integral with the main shaft 4 by way of a bearing. Pin lock wheels 50 and 51 are rotatably mounted on the top end part of the above-mentioned shafts 45 and 48, and, as shown in FIG. 4, are so disposed that they may be engaged with three cam faces 35a, 35b, and 35c formed on the periphery of the cam plate 35 so as to take a synchronism with meshing between the three gear sections 36a, 36b, and 36c of the above-mentioned intermittent gear 36 and the gears 40 and 44, and to prevent the gears 40 and 44 from overrunning.

Figure 2:
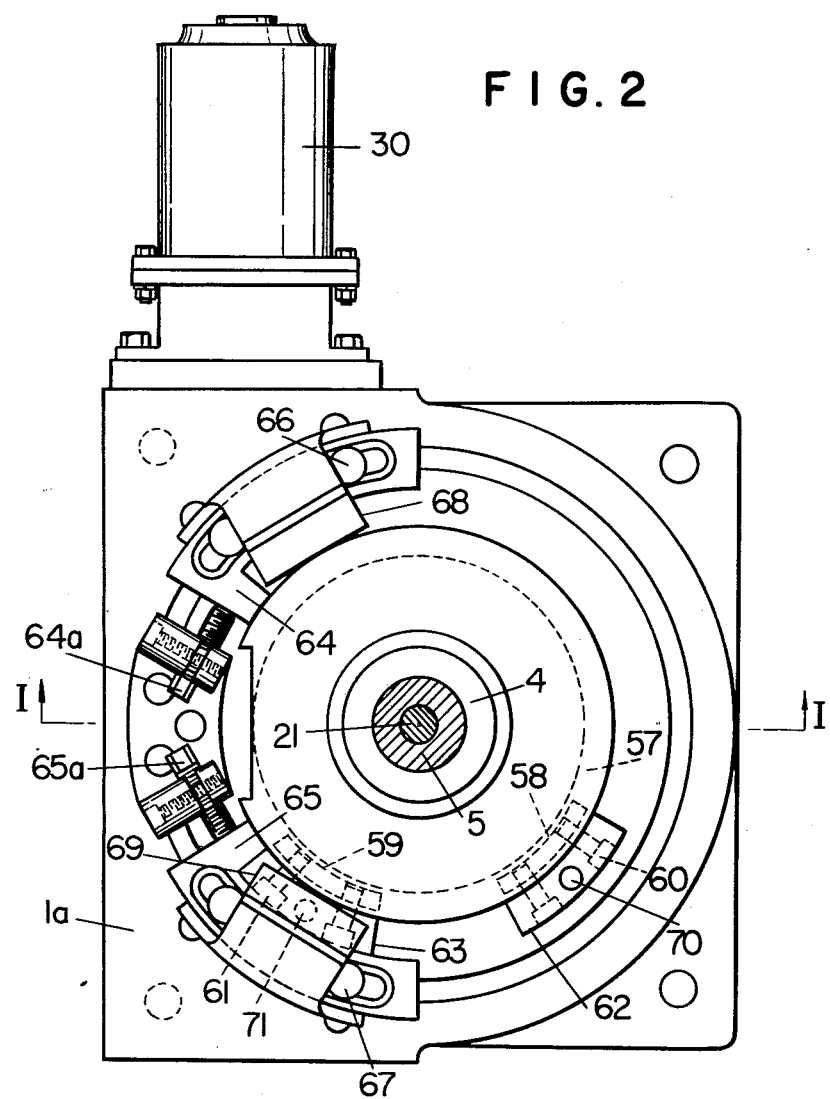
FIG. 2 is a plan view in cross-section, when taken along the line II—II in FIG. 1.

The above-mentioned worm gear 34 has an arcuate groove 52 along its inner peripheral surface for sliding relative to the main shaft 4 as shown in FIGS. 1, 4, 5 and 6. In this groove 52, there is positioned a key 53 which is provided on the outer peripheral surface of the main shaft 4 so as to have something to do with the rotational movement of the main shaft 4 to be described later. As shown in FIGS. 1 and 2, a circular disc 56 is mounted in the vicinity of the top surface of the above-mentioned housing 1 by means of the main shaft 4, the key 54, and the key groove 55 so as to be rotatable together with the main shaft 4. A groove 57 in the shape of a letter "T" in its cross-section is formed throughout the outer periphery of the circular disc 56 in a manner to be opened in the outward direction of the disc. As shown in FIG. 2, a detection element block 62 which detects termination of the forward movement of the above-mentioned main shaft 4 and another detection element block 63 which detects termination of return movement of the main shaft, both being actuated at the time of rotation of the main shaft 4, are mounted at a certain definite space interval and fixed by bolts 60 and 61 on plates 58 and 59 fitted in the T-shaped groove 57. Further, on the top surface 1a of the housing 1, there are fixedly secured a stopper 64 for termination of the forward movement of the main shaft 4, and another stopper 65 for termination of the return movement thereof, both being provided at the terminal parts of the reciprocating movement of each of the abovementioned detection element blocks 62 and 63. Switching devices 68 and 69 for the forward and reverse rotations of the reversible electric motor 30 are positioned at locations opposite to the above-mentioned respective detection element blocks 62 and 63 on the upper part of each of the stoppers 64 and 65.

In the embodiment shown in the drawing, rod-shaped ferrite members 70 and 71 are mounted on the detection element blocks 62 and 63 in such a manner that they may project from the upper surface of the blocks. On the other hand, a non-contact type switching mechanism which utilizes a hole element integrated circuit available in the general market is adopted for the above-mentioned switching devices 68 and 69. It is, of course, possible that a contact type switching mechanism which utilizes a microswitch, and the like be made use of.

As will be explained later, the rotatory angle of the main shaft 4, or the arm 8, varies depending on the position of the above-mentioned forward movement termination detection element block 62 with respect to the peripheral surface of the circular disc 56. In the illustrated embodiment, the construction is such that the arm 8 (or the main shaft 4) rotates by 165°. In the case of the return movement detection element block 63 alone, the arm 8 (or the main shaft 4) rotates by 240 degrees in the illustrated embodiment. This rotatory angle is also varied by the position of each stopper and the size of each detection element block. In FIG. 2, reference numerals 64a and 65a respectively designate adjustment bolts for stoppers 64 and 65.

2. Operations of the Manipulator

In the following, the operations of the manipulator according to the present invention will be explained.

Figure 3:
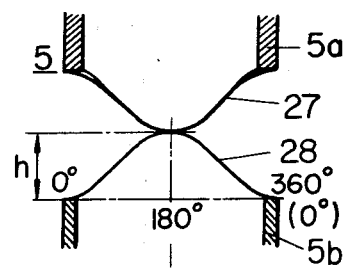
FIG. 3 is a developed view of the cam portion formed at each opposing end surface of the auxiliary shaft.

The device as shown in FIG. 1 is in such a state that the noses of the mutually opposing cams 27 and 28 of the auxiliary shaft 5 are in contact each other as shown in FIG. 3, and the upper portion 5a of the auxiliary shaft 5 compresses a coil spring 72 disposed within a space defined between the inner periphery of the main shaft 4 and the outer periphery of the upper portion 5a itself and rises for a lifting quantity h in FIG. 34, while the finger members 12, 12 of the hand member 11 are opened. This state is made the original position of the manipulator of the present invention.

Figure 5:
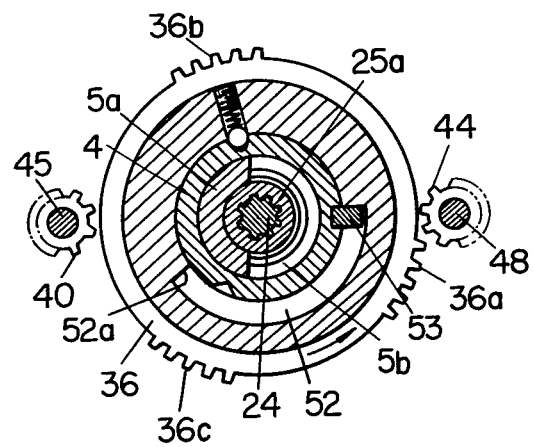
FIG. 5 is also a cross-sectional view of the arrangement of the main shaft, auxiliary shaft, intermittent gear, and other related component parts as viewed along the line V—V in FIG. 1.
Figure 6:
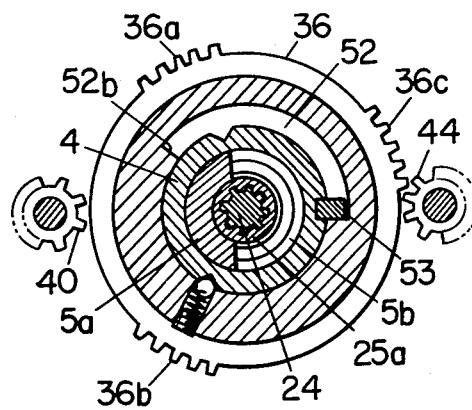
FIG. 6 is a cross-sectional view similar to that in FIG. 5 showing a positioned relationship of the shafts and related parts, at which a work-piece is clamp-held in the hand member.

(1) When the main switch is closed, and the reversible electric motor 30 is forwardly rotated by the action of the switch means 69 for the forward rotation, the driving force of the electric motor is transmitted to the worm gear 34 through the worm shaft 31, and the intermittent gear 36 rotates in the counter-clockwise direction as shown in FIG. 5. When the gear section of the intermittent gear 36 is meshed with the gear 44 to rotate this latter gear, the driving force is further transmitted to the lower cam shaft portion 5b of the auxiliary shaft 5 through the gears 42, 43, and 41, and the cam shaft portion 5b begins to rotate. The upper cam shaft portion 5a of the auxiliary shaft 5 lowers for the above-mentioned lifting quantity h by the weight of the arm 8, etc., and an expanding force of the coil spring 72, whereby the peak and valley portions of both cams 27 and 28 become engaged with each other. Thus, the number of teeth in each gear is so selected that, when the lower cam shaft portion 5b rotates for 180°, the gear 44 and the gear 36a may be disengaged. A convex cam surface 51a of the pin lock wheel 51 is engaged with a concave cam surface 35a of the cam plate 35 to take a synchronism with meshing of the gears 36a and 44, and to prevent them from over-running (FIG. 4) as well.

(2) By the subsequent rotation of the intermittent gear 36, its gear section 36b now becomes engaged with the gear 40, and, when the gear 40 commences its rotation, the driving force is transmitted to the boss shaft portion 25 of the control shaft 21 through the gears 38, 39, and 37. Next, the convex cam surface 50a of the pin lock wheel 50 becomes engaged with the concave cam surface 35b of the cam plate 35. The control shaft 21 is rotated by rotation of the boss shaft portion 25 through the spline-connection, and the eccentric pin 23 on the top of the control shaft 21 causes the opening and closing force transmitting shaft 19 to shift leftward in FIG. 1. Following the movement of the opening and closing force transmitting shaft 19, the operating shaft 15 for opening and closing the finger members also moves to the same direction to close the finger members 12, 12 through the short sides 12a, 12a of both finger members connected with the operating shaft 15, to thereby clamp-hold the work-piece 14 which has been conveyed to the position of the finger members as shown in the dot-and-dash line. Simultaneously with this clamp-holding operation, the meshing between the gear 40 and the gear 36b is released.

(3) By the subsequent rotation of the intermittent gear 36, the gear section 36c of the intermittent gear 36 becomes meshed with the gear 44, whereby the driving force is transmitted to the lower cam shaft portion 5b of the auxiliary shaft 5 through the gears 42, 43, and 41. Rotation of the lower shaft portion 5b of the auxiliary shaft 5 causes the upper shaft portion 5a thereof to rise for the lifting quantity h by the action of the mutually opposed cam faces 27 and 28, that is, the arm 8 is elevated in the state of its clamp-holding the work-piece in the finger members. Simultaneously with rotation by 180° of the lower shaft portion 5b of the auxiliary shaft 5, the meshing between the gear section 36c of the intermittent gear 36 and the gear 44 is released. While both gears 36c and 44 are in the meshed state, the convex cam surface 51b of the pin lock wheel 51 is in engagement with the concave cam surface 35c of the cam plate 35.

(4) At the completion of the preceding three operating steps (1), (2), and (3), a terminating end part 52a (FIG. 5) of the arcuate groove 52 formed in the worm gear 35 becomes in contact with the key 53 of the main shaft 4. In this consequence, the main shaft 4, the group of gears mounted on the frame 49 integral with the main shaft 4, and the auxiliary shaft 5 which is key-connected with the main shaft 4 rotate in the counterclockwise direction together with the worm gear 35, whereby the arm 8 commences rotation in the state of its clamp-holding the work-piece 14 in the finger members. Following the rotation of the above-mentioned main shaft 4, the circular disc 56 also rotates along with it until the front end surface of the element block 62 for detecting termination of the forward movement of the arm 8 contacts the stopper 64, i.e., it rotates by approximately 165°. As soon as the forward movement termination detection element block 62 collides with the stopper 64, the switching device 68 for the reverse rotation of the reversible electric motor 30 becomes actuated by means of the ferrite member 70 of the forward movement termination detection element block 62, whereby the motor 30 stops its forward rotation and begins to rotate inversely.

(5) By the inverse rotation of the above-mentioned reversible electric motor 30, the above-mentioned operating steps (1), (2), and (3) proceed in the inverse sequence. In more detail, when the gear section 36c of the intermittent gear 36 becomes engaged with the gear 44, the arm member lowers to cause the gear section 36b of the intermittent gear 36 to be meshed with the gear 40, whereby the finger members 12, 12 are opened to release the work-piece 14 therefrom. Subsequently, by the meshing of the gear section 36a of the intermittent gear 36 and the gear 44, the arm member rises upward until it collides with the key 53 of the main shaft 4, which is provided at the starting end part 52b of the arcuate groove 52 formed in the worm gear wheel 34, and then the main shaft 4, the arm member 8, and so on commence rotation in the clockwise direction. And, as soon as the return movement termination detection element block 63 collides with the stopper 65, i.e., when the entire device returns to its original position, the forward rotation switching means 69 becomes actuated by the ferrite member 71 to cease the reverse rotation of the motor 30, and, at the same time, causes it to rotate in the forward direction. Thereafter, the afore-described operational steps will be repeated.

The above-mentioned both switching means 68 and 69 are so constructed that they may immediately return to their original position, when the detection element blocks 62 and 63 are not at the corresponding positions.

In the afore-described embodiment, the eccentric pin 23 may be directly associated with operating shaft 15 for the opening and closing of the finger members 12, 12.

Although not shown in the drawing, there is additionally provided braking of retaining means such as, for example, a click stopper mechanism on the opposing side surfaces of the element block 62 and the stopper 64, or any other appropriate position therebetween, so that it may be retained temporarily at the stopped position until it commences the subsequent rotational movement, when the element block 62 collides with the stopper 68. The same structure is provided between the element block 63 and the stopper 65 to attain the same purpose at the time of the reverse rotation.

3. Modified Structure

Figure 9:
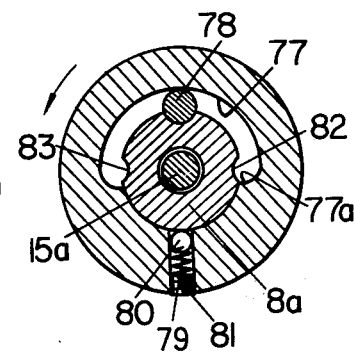
FIG. 9 is a cross-sectional view of the modified member shown in FIG. 8, when taken along the line IX—IX in FIG. 8.
Figure 7:
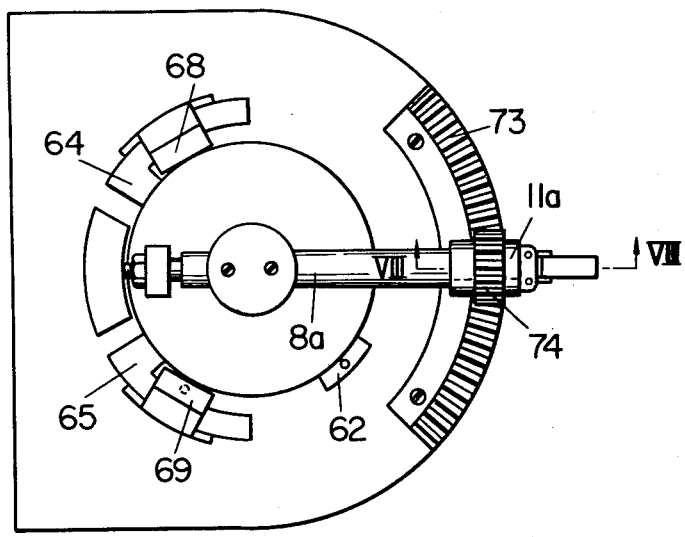
FIG. 7 is a plan view showing a modified embodiment of a member which imparts a revolving action to the arm member.
Figure 8:
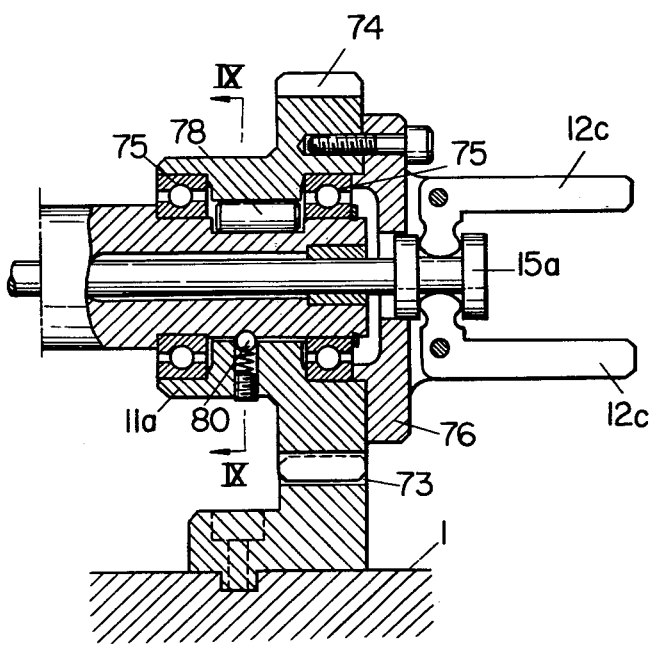
FIG. 8 is a cross-sectional view of the principal part of the modified member shown in FIG. 7, when taken along the line VIII—VIII in FIG. 7.

FIGS. 7 through 9 illustrate a modified embodiment of the manipulator according to the present invention, in which the device is so constructed that the hand member thereof may be rotated following the revolution of the arm member.

As shown in FIGS. 7 and 8, an arcuate rack 73 is fixed on the top surface of the housing, and a pinion 74 to be meshed with the rack 73 is formed on the hand portion 11a. The hand portion 11a is supported by bearings 75, 75 in a freely rotatable manner with respect to an arm 8a. The connecting relationship between a pair of finger members 12c, 12c and a shaft 15a for opening and closing operations thereof are the same as that of the previous embodiment. The finger members 12c, 12c are fixed to the hand portion 11a by way of supporting plate 76. As shown in FIG. 9, an arcuate groove 77 of substantially 180° of a circular angle is formed in the inner peripheral surface of the hand portion 11a, and a roller 78 is inserted into the arcuate groove 77 and in engagement with any one concave portions formed in the outer peripheral surface of the arm 8a. At a position opposite to the roller 78, there is disposed a ball 80 which is urged against the outer periphery of the arm 8a by the force of a coil spring 79. The ball 80 and the coil spring 79 are prevented from slipping out by means of a screw-threaded bolt, or plug, 81. The concave portions 82 and 83 are formed in the outer peripheral surface of the arm 8a in a mutually opposed relationship and on a line substantially orthogonal with a straight line connecting the above-mentioned roller 78 and the ball 80. When the hand portion 11a rotates, for example, by 90 degrees in the counter-clockwise direction from its state as shown in FIG. 9, one end 77a of the arcuate groove 77 collides with the above-mentioned roller 78, and, at the same time, the ball becomes engaged with the concave portion 83 in the outer peripheral surface of the arm 8a, whereby the rotation of the hand portion is stopped.

4. Forward and Reverse Rotation of the Reversible Electric Motor

Figure 10:
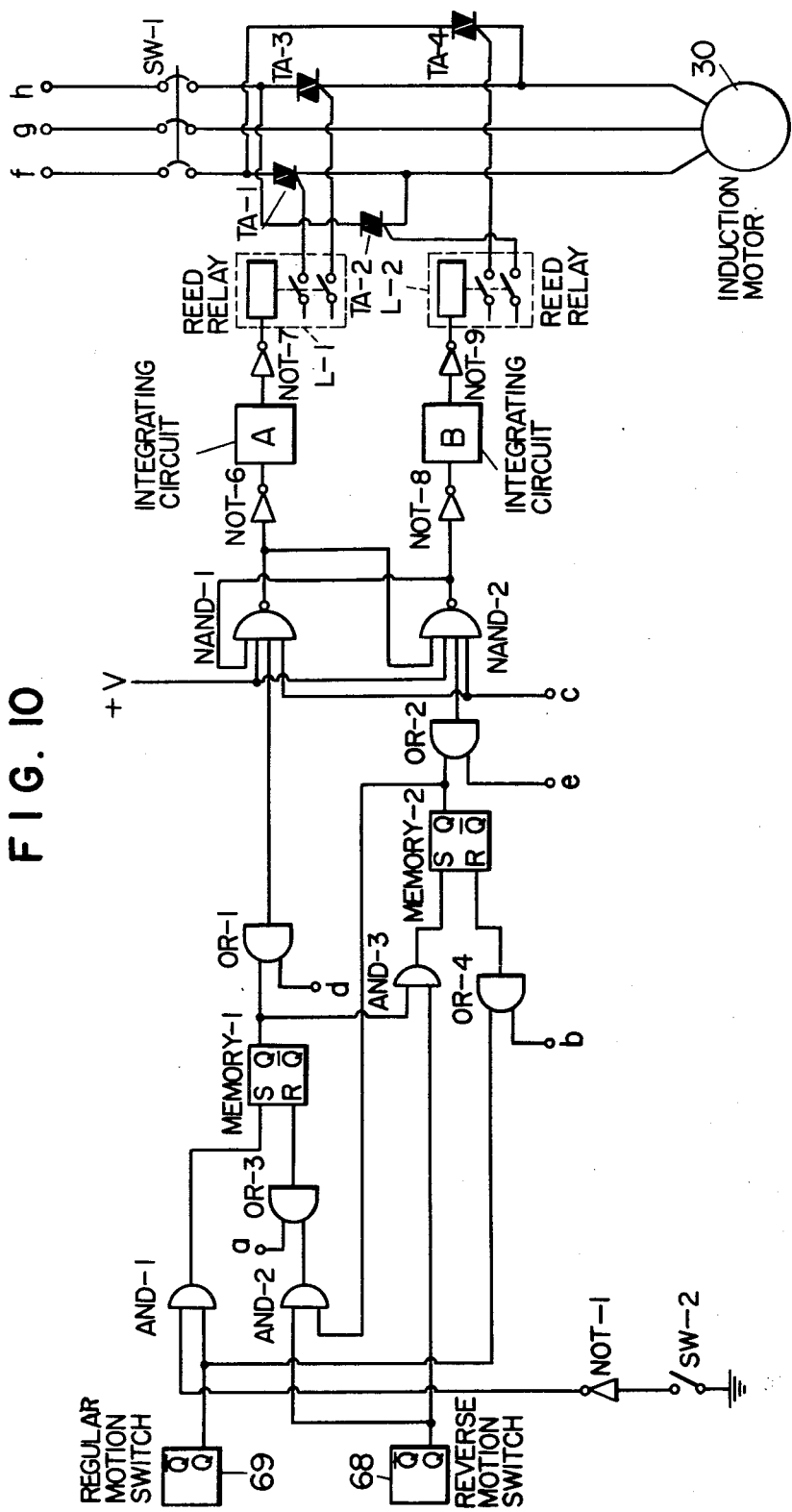
FIG. 10 is an electrical circuit diagram for driving the reversible electric motor.

In the following, the forward and reverse rotations of the reversible electric motor 30 will be explained in reference to an electric circuit diagram shown in FIG. 10.

a. Forward rotation of the reversible electric motor:

When a main switch SW-1 is closed, followed by closure of an automatic start switch SW-2, output signals from a "not" circuit NOT-1 and a forward rotation switch means 69 are applied to an "and" circuit AND-1 as inputs. As the consequence of this switch closure, a lead relay L-1 is also closed in the circuitry of the "and" circuit AND-1 → a memory circuit MEMORY-1 → an "or" circuit OR-1 → a "nand" circuit NAND-1 → a "not" circuit NOT-6 → an integrating circuit A → a "not" circuit NOT-7, whereby a TRIAC's TA-1 and TA-3 become conductive, and the motor 30 rotates forwardly. That is, the arm 8 begins to rotate in the direction of its forward movement. (NOTE: "TRIAC38 is a trade name of a three-terminal alternating current control element, a product of General Electric Co., U.S.A., having a bi-directional symmetric characteristic and capable of controlling the current flow from a gate, the most prominent characteristic of which is that a signal of either positive or negative polarity may be imparted to the gate, whereby a trigger circuit can be remarkably simplified.)

As soon as the forward movement termination detection element block 62 becomes in contact with the stopper 64, and output signal from the switching means 68 for the reverse rotation is applied to an "and" circuit AND-3 as an input. By this input signal, the memory circuit MEMORY-1 is reset in the circuitry of the "and" circuit AND-3 → a memory circuit MEMORY-2 → an "and" circuit AND-2 → an "or" circuit OR-3 → the memory circuit MEMORY-1, whereby the motor terminates its forward rotation.

b. Reverse rotation of the reversible electric motor:

A lead relay L-2 is closed in the circuitry of the memory circuit MEMORY-2 → an "or" circuit OR-2 → a "nand" circuit NAND-2 → a "not" circuit NOT-8 → an integrating circuit B → a "not" circuit NOT-9, whereby the TRIAC's TA-2 and TA-4 become conductive, and the motor 30 rotates in the reverse direction. That is, the arm 8 begins to rotate in the direction of its return movement.

As soon as the forward movement termination detection element block 63 becomes in contact with the stopper 65, an output signal from a switching means 69 for the forward rotation is applied to an "or" circuit OR-4 as an input, whereby the memory circuit MEMORY-2 is reset by an output signal from the "or" circuit OR-4, and the motor 30 terminates its reverse rotation. Upon termination of the reverse rotation of the motor 30, the switch SW-2 is opened, and the manipulator 1 thus completes one operating cycle. The above-mentioned operating cycle can be automatically and continuously repeated with the switch SW-2 being closed.

One of the terminals a of the above-mentioned "or" circuit OR-3, one of the terminals b of the "or" circuit OR-4, and one of the terminals c of the "nand" circuit NAND-2 are the interlocking terminals for the reversible electric motor 30. Also, one of the terminals d of the "or" circuit OR-1 and one of the terminals e of the "or" circuit OR-2 are the terminals for inching forward rotation and inching reverse rotation, respectively. Reference symbols f, q, and h designate terminals for connecting an alternating current power source.

The manipulator, or the robot mechanism for industrial purposes, according to the present invention, can be operated repeatedly in a time period of as short as 2 seconds for one cycle which corresponds to the operating steps (1) to (5) as detailed in the foregoing.

The power transmission system of the manipulator according to the present invention is constructed with various mechanical means such as gear trains, or groups of gears, cams, and so on. These mechanical parts are all accommodated in the housing, which makes the external appearance of the device as a whole simple and compact, hence highly convenient in installing the same in contiguity to other machines and appliances. The housing also serves to prevent the power transmission system inside it from being stained with chips, dusts and various other contaminating substances. Furthermore, depending on necessity, a dust preventing cover in a bellow-shape may be fitted around those parts which are projecting outside of the housing.

Although the present invention has been described in the foregoing in reference to preferred embodiment thereof, it should be noted that these specific embodiments are merely illustrative and not restrictive, and that any changes and modifications may be made by those skilled in the art within the spirit and scope of the present invention as set forth in the appended claims.

What is claimed is:

1. A manipulator for industrial purposes, which comprises in combination:
    (a) a housing;
    (b) a main shaft held on both upper and lower surfaces of said housing in a rotatable manner;
    (c) an auxiliary shaft concentrically fitted in said main shaft in a manner as to be rotatable together with said main shaft, and projecting outwardly of said upper surface of said housing, said auxiliary shaft being also movable in the up and down direction;
    (d) an arm member fixedly supported on the top end part of said auxiliary shaft substantially perpendicularly with respect to the axial line thereof, said arm member being provided therein with a control mechanism for holding, releasing and shifting a work-piece from one place to any other designated place;
    (e) a hand member for clamp-holding the work-piece therein, said hand being mounted on one end part of said arm, and having at the tip end thereof a pair of finger members;
    (f) a control shaft which is concentrically fitted within said auxiliary shaft in a rotatable manner, and which operates said control mechanism for opening and closing said finger members provided on said arm member;
    (g) a reversible electric motor fixedly provided on one external surface part of said housing;
    (h) a worm gear member which is rotatably mounted on an outer peripheral surface part of said main shaft, and receives the driving force of said reversible electric motor through a worm provided on said motor and being meshed therewith;
    (i) a group of gears for moving said auxiliary shaft in the up and down direction;
    (j) another group of gears for rotating said control shaft;
    (l) an intermittent gear which rotates along with said worm gear, and selectively transmits the driving force of said reversible electric motor to said both groups of gears to cause said auxiliary shaft to move up and down, or to cause said control shaft to rotate in either direction;
    (m) means to cause said main shaft to follow the movement of said worm gear after said main shaft is rotated for a certain definite rotational angle; and
    (n) means to detect rotation of said main shaft after the same is rotated for a certain definite angle, and to cause said reversible electric motor to rotate forwardly or reversely, said worm, worm gear, both gear groups, supporting frame, intermittent gear, and means for causing said main shaft to follow the movement of said worm gear being accommodated within said housing.

2. The manipulator as set forth in claim 1, in which said pair of finger members for clamp-holding a work-piece provided on said hand member are shaped in a letter "L", and opposed to each other, and are capable of being opened and closed; said control mechanism for opening and closing said finger members has an operating shaft for opening and closing said finger members which passes through said arm member and hand member and which is engaged, at one tip end thereof, with the end part of one side of said L-shaped finger members, and a shaft for transmitting opening and closing force of said finger members which is connected to the other end of said operating shaft for opening and closing said finger members and moves together with said operating shaft, said force transmitting shaft having a groove orthogonal to the direction of the axial line of said transmitting shaft; and said control shaft has an eccentric pin which is engaged with a groove formed in said shaft for transmitting force exerted at the opening and closing of said finger members.

3. The manipulator as set forth in claim 1, in which said auxiliary shaft is split into upper and lower portions, and each of the opposing surfaces of said upper and lower portion has an outwardly raised, or convex, cam portion formed on the circumference thereof.

4. The manipulator as set forth in claim 1, in which said means for causing the main shaft to follow the movement of said worm gear comprises an arcuate groove formed in the inner peripheral surface of said worm gear and a key member fixedly provided on the outer peripheral surface of said main shaft.

5. The manipulator as set forth in claim 1, in which said detecting means for detecting rotational angle of said main shaft comprises: a forward movement termination detection element and a return movement termination detection element, both of which rotate together with said main shaft; and a change-over switch for forward rotation of said reversible electric motor and a change-over switch for reverse rotation of said motor, both of which are respectively disposed at a position where said main shaft terminates its forward movement, and at another position where said main shaft terminates its return movement in said housing.

6. The manipulator as set forth in claim 5, in which a supporting plate for forward and return movements termination detection elements which rotate together with said main shaft is provided on the top surface of said housing, and, the rotational angle of said main shaft is made changeable by changing the fitting position of said both detecting elements to said supporting plate.

7. The manipulator as set forth in claim 1, in which a pinion is provided at the outer periphery of said hand member, and a rack to be meshed with said pinion is provided on the upper surface of said housing so that a rotatory movement is imparted to said arm member along with revolution of said hand member.

* * * * *